(12) United States Patent
Hashimoto

(10) Patent No.: US 6,247,241 B1
(45) Date of Patent: Jun. 19, 2001

(54) BALL DIAMETER AUTOMATIC MEASUREMENT DEVICE AND METHOD

(75) Inventor: Koji Hashimoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/244,102

(22) Filed: Feb. 4, 1999

(30) Foreign Application Priority Data

Feb. 4, 1998 (JP) ................................................ 10-023172

(51) Int. Cl.[7] .............................. G01B 3/00; A63B 49/00
(52) U.S. Cl. ............................ 33/555.1; 33/702; 33/703; 33/704; 473/351
(58) Field of Search ............................. 33/702, 703, 704, 33/555.1; 473/351

(56) References Cited

U.S. PATENT DOCUMENTS

| 4,903,413 | * | 2/1990 | Bellwood | ............................. | 33/351 |
| 6,082,015 | * | 7/2000 | Bjorkdahl | ........................... | 33/555.2 |

FOREIGN PATENT DOCUMENTS

| 0264977 | * | 2/1989 | (DD) | .................................... | 33/555.1 |
| 0595486A1 | * | 5/1994 | (EP) | .................................... | 33/555.1 |
| 0135711 | * | 6/1987 | (JP) | .................................... | 33/555.1 |
| 0042309 | * | 2/1990 | (JP) | .................................... | 33/555.1 |
| 6254102A | * | 11/1992 | (JP) | .................................... | 33/555.1 |
| 02159501A | | 7/1994 | (JP) | .................................... | G01B/5/08 |
| 11-223502 | | 8/1999 | (JP) | .................................... | G01B/5/08 |
| 1108069 | * | 8/1984 | (SU) | .................................... | 33/555.1 |
| 001776974 | * | 11/1992 | (SU) | .................................... | 33/555.1 |

* cited by examiner

Primary Examiner—G. Bradley Bennett
Assistant Examiner—Gail Verbitsky
(74) Attorney, Agent, or Firm—Sughrue, Mion, Zinn, Macpeak & Seas, PLLC

(57) ABSTRACT

The ball diameter automatic measurement device according to the present invention preferably comprises a displacement sensor, a dividing plate, a slider and a measurement controller. The displacement sensor measures the diameter of a ball positioned in a measurement position. The dividing plate holds a ball to be measured and reciprocates the same between a predetermined position and the measurement position. The slider rotates the ball in the predetermined position by a predetermined angle when the dividing plate is moved. The measurement controller stores and outputs measured values obtained by repeated measurement and measurement after the rotation of the predetermined angle. According to the device, it is possible to measure a ball diameter accurately without being influenced by body temperature, air temperature and individual workmanship when the diameter of a ball is measured.

9 Claims, 9 Drawing Sheets a. MEASUREMENT POSITION
b. PHASE CHANGING POSITION
c. LOADING POSITION
d. MASTER STORAGE POSITION
e. DETECTION POSITION
f. UNLOADING POSITION

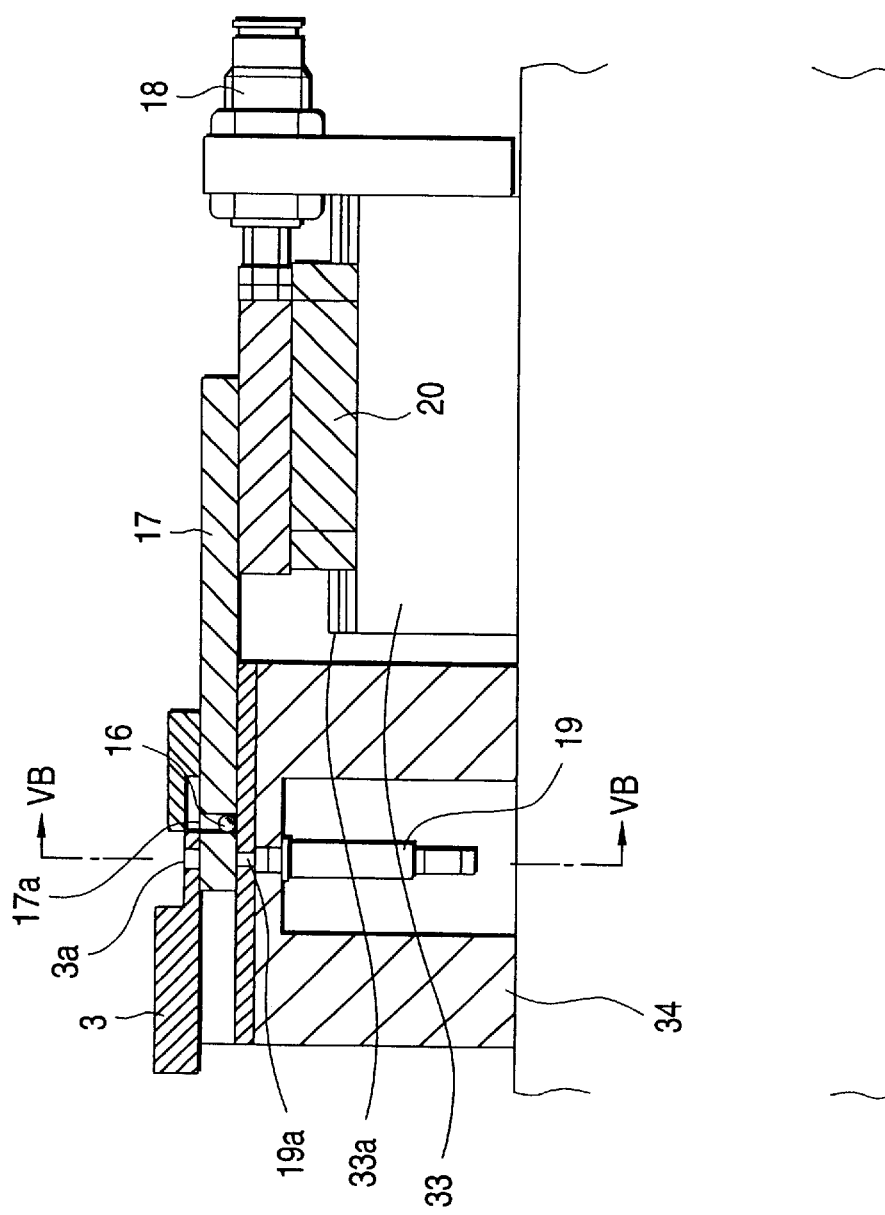

BALL DIAMETER AUTOMATIC MEASUREMENT DEVICE AND METHOD

BACKGROUND OF THE INVENTION

The present invention relates to a ball diameter automatic measurement device and method for a rolling bearing. The present invention, more particularly, relates to ball diameter automatic measurement device and method which is capable of determining positions at which a ball are measured based upon the rotation of the ball, and capable of acquiring the average value of measured values and dispersion in the ball diameters at the various positions.

Further, the present invention also relates to ball diameter automatic measurement device and method which is free from the effect of body temperature and a personal error, and which is further hardly influenced by the fluctuation of air temperature.

Japanese Patent Examined Publication No. Hei. 6-54204 teaches a conventional ball diameter measurement device, in which a method of pressing and positioning a ball manually on three planes. The three planes are defined by an upper surface of a fixed board and a pair of surfaces of the notch of a notched groove of a ball holder. After positioning the ball on the three planes, the ball diameter is measured.

In the conventional ball diameter measurement device, as a ball is manually positioned at a measurement point by using a pair of tweezers, it is easily influenced by body temperature and then the temperature drift is large. Since distance between a hand for operating the tweezers and the ball held between the tweezers is so small, the ball is indispensably influenced by the body temperature. Also, as a ball is manually positioned in a measurement position using tweezers, measurement device cannot be covered or accommodated within a closed box having a cover, and then it is readily influenced by the fluctuation of air temperature. Further, as a ball is manually positioned at the measuring position, a personal error is readily made. Therefore, there is a problem that it is difficult to acquire the measurement precision of ±0.01 µm or less.

SUMMARY OF THE INVENTION

It is an object of the present invention to provide a ball diameter automatic measurement device which is free from the effect of body temperature and removes the effect of the fluctuation of air temperature when the ball diameter is measured, and simultaneously enables a predetermined accurate measurement independent of the individual operator's talent or art.

The above-mentioned object can be attained by a ball diameter measurement device, according to the present invention, comprising: a ball movement means, means for changing the phase of the diameter of a ball, and measurement control means which are provided to measure the diameter of a ball.

The ball diameter automatic measurement device, according to the present invention, preferably comprises:

a displacement sensor for measuring the diameter of a ball positioned in a measurement position;

a dividing plate holding a ball to be measured which can be reciprocated between a predetermined position and the measurement position;

a slider for rotating the ball in the predetermined position by a predetermined angle as the dividing plate is moved; and measurement control means for storing and outputting measured values obtained by repeated measurement and measurement after the rotation of the predetermined angle.

In the above-mentioned construction, the above ball to be measured denotes a measured ball or a master ball.

The above object can also be achieved by a ball diameter automatic measuring method, according to the present invention, comprising the steps in sequence of:

moving a ball held on a dividing plate under a displacement sensor in a measurement position holding the ball between a gauge element located under the displacement sensor and a measuring table, applying pressure to the ball by the gauge element and storing vertically fluctuating values of the core of the displacement sensor, moving the ball held on the dividing plate to a slider, rotating the ball on the slider by a predetermined angle and moving the dividing plate, positioning it under the displacement sensor in the measurement position again, applying pressure to the ball by the gauge element, and storing the fluctuating values of the core of the displacement sensor, in which the above-mentioned sequential steps are repeated by predetermined times, and an average value and standard deviation are calculated based upon the stored values.

The above ball movement means denotes means for holding a measured ball on a dividing plate which can be reciprocated and moving the ball between a predetermined position and a measurement position and concretely, denotes means for locating a ball in a ball holding hole slightly larger than the diameter of the ball and provided to a dividing plate, rolling the ball on a measuring table as the dividing plate is moved and moving the ball between a predetermined position and a measurement position.

Also, the above means for changing the phase of the diameter of a ball denotes means for rotating a ball positioned in a position for changing a phase by a predetermined angle to change a position in which the diameter of the ball is measured, and concretely, denotes means for rotating the ball in a ball holding hole positioned on a slider by a predetermined angle by moving the slider. At that time, the slider is moved in a direction different from a direction in which a dividing plate is moved. For example, a phase is changed by rolling a ball by desired quantity in a direction perpendicular to a rolling direction by the movement of a dividing plate. As the ball is never rolled in this direction except changing a phase, accidental sliding and others hardly occur and a position for measuring the diameter of a ball after rolling is securely different from a measurement position before rolling. A phase can be also changed through a process of once positioning a ball before a ball measurement position, sliding the ball by moving a dividing plate afterward and positioning the ball in the ball measurement position at the time of measurement, and this can be also combined with changing a phase in the above perpendicular direction. That is, it is because the distance of a ball from a phase changing position to a measurement position (the number of the revolution of the ball) and the return distance of the ball from the measurement position to the phase changing position (the number of the revolution of the ball) are different.

Further, the above measurement control means denotes means for storing measured values obtained by repeating a process of measuring after predetermined times and measuring after a phase is changed per one ball, executing statistical processing and outputting it. Concretely, the above means denotes means for converting measured values from analog to digital, storing them in the memory of a computer and others and calculating the average value of measured values and a situation of the distribution of measured values such as the deviation (so called as deviation) of a diameter, for example 6σ, skewness and the degree of a gradient.

Temperature change compensating means can be also added to the above-mentioned device. As the temperature change compensating means, a drift compensating measurement system for compensating drift having the substantially same construction as a main measurement system described above is provided. The drift compensating measurement system is provided with a displacement sensor for measuring the diameter of a ball located in a measurement position which is provided on the opposite side to the main measurement system. In a measurement position in the drift compensating measurement system, a drift compensating ball, a member for positioning the drift compensating ball, a gauge element supporting part holding a gauge element for applying pressure to a ball to be measured positioned on a measuring table and the drift compensating ball in a concave portion on the side of a measuring column, a sensor lifting cylinder arranged in the hole of the measuring column to lift the above gauge element supporting part respectively arranged in the measurement system and the measurement system for compensating drift and measurement control means for subtracting the measured value of the drift compensating ball in the measurement system for compensating drift from the measured value of a ball in the measurement system to obtain a measured value are provided. The effect of the change of temperature can be further reduced using the measured value of the drift compensating ball by adding the above configuration to the present invention because temperature drift is removed.

In a temperature change compensating process, the sensor lifting cylinder is respectively lifted in the measurement system and the measurement system for compensating drift, clearance is provided between the gauge element held by the gauge element supporting part and the measured table, a ball to be measured in the ball holding hole is moved to the clearance between the gauge element and the measuring table by the dividing plate, the sensor lifting cylinder is lowered, the ball to be measured and the drift compensating ball are held between the gauge element and the measured table, after the ball to be measured is positioned in a measurement position (a ball measurement position), pressure is applied to the respective balls by the gauge element and a value measured by the displacement sensor in the measurement system for compensating drift is subtracted from a value measured by the displacement sensor in the measurement system.

Master loading means can be added to the present invention in addition to the above temperature change compensating means. For the master loading means, a master storing plate for storing a master ball, a cylinder inserting hole with approximately the same diameter as the ball holding hole of the dividing plate provided to the master storing plate, a lifting cylinder provided with a head rod for receiving or passing the master ball arranged under the master storing plate and located in the cylinder inserting hole from/to the dividing plate and an advance cylinder which can move the cylinder inserting hole of the master storing plate between a position over the lifting cylinder and a predetermined position (a position before the advance cylinder is moved) can be provided. The variation of the measured result of the master ball can be used for correcting the measured result of a ball to be measured by adding the above configuration and further, the reliability can be enhanced.

In a master loading process, the cylinder inserting hole of the master storing plate storing the master ball is moved over the lifting cylinder by the advance cylinder, the ball holding hole of the dividing plate is moved over the cylinder inserting hole of the master storing plate, the head rod of the lifting cylinder is lifted and the master ball located in the cylinder inserting hole is moved to the dividing plate, the dividing plate is moved to a measurement position and after the diameter of the master ball is measured, the ball holding hole of the dividing plate is positioned over the cylinder inserting hole of the master storing plate again and the master ball is moved to the master storing plate. The above master loading process is added, the master ball is measured every time the predetermined number of balls to be measured are measured and the measured values of the balls to be measured can be corrected based upon the measured value.

The above-mentioned object can be attained by a ball diameter automatic measurement device comprising:

a ball carrying means for carrying a ball to be measured to a predetermined measuring position in a ball carrying direction;

a ball diameter measuring means for measuring a diameter of the ball at the predetermined measuring position;

a phase shifting means for shifting a phase of the ball in a ball shifting direction so as to be changeable a measured portion of the ball every measurements; and a controller for controlling the ball carrying means and the phase changing means.

In the above-mentioned ball diameter automatic measurement device, it is preferable that the ball carrying direction is different from the ball shifting direction, and the ball is shifted at a shifting position which is different from the measuring position.

In addition, in the above-mentioned ball diameter automatic measurement device, it is preferable to further comprise a drift compensating ball, in which the ball diameter measuring means comprises:

a main measurement system measuring a diameter of the measured ball;

a drift compensating measurement system which is arranged in adjacent to the main measurement system and measures a diameter of the drift compensating ball while the measured ball is being measured by the main measurement system simultaneously; and a comparing member for comparing the measured value of the main measurement system and the measured value of the drift compensating measurement system, and in which each of the main measurement system and the drift compensating measuring system comprises a displacement sensor.

In the above-mentioned ball diameter automatic measurement device, it is advantageous that the ball includes a measured sphere and a master sphere having a referenced size, the automatic measurement device further comprises:

a master sphere loading means for accommodating the master sphere at an accommodating position and loading the master sphere from the accommodating position to a position where the master sphere is carriable by the ball carrying means.

In the above-mentioned ball diameter automatic measurement device, it is further advantageous that the ball carrying means comprises:

a loading shoot having one end capable of storing a plurality of balls including the ball to be measured and other end located at a position which is accessable by the ball carrying means; and a dividing member interposed between the one end and the other end for transporting only one of the plurality of the balls from the one end to the other end.

The above-mentioned object can also be achieved by a ball diameter automatic measurement method, according to the present invention, comprising the steps of:

carrying a ball to be measured to a predetermined measuring position in a ball carrying direction;

measuring a diameter of the ball at the predetermined measuring position;

shifting a phase of the ball in a ball shifting direction by a predetermined angle so as to change a measured portion of the ball every measurements;

repeating the measuring step and the shifting step by predetermined times; and calculating an averaged value of the measured diameters and a diameter deviation of the measured diameters.

In the above-mentioned ball diameter automatic measurement method, it is preferable that the ball carrying direction is different from the ball shifting direction, and the ball is shifted at a shifting position which is different from the measuring position.

Further, in the above-mentioned ball diameter automatic measurement method, it is more preferable that the diameter measuring step comprises the steps of:

measuring a diameter of the ball with a first displacement sensor;

measuring a diameter of a referenced ball with a second displacement sensor while the ball diameter is being measured by the first displacement sensor; and evaluating a diameter of a ball to be measured in accordance with a difference between the an output of the first displacement sensor and an output of the second displacement sensor.

Moreover, in the above-mentioned ball diameter automatic measurement method, it is advantageous that the ball includes a measured sphere and a master sphere having a referenced size, and the method further comprises the steps of:

compensating a measured diameter of the measured sphere in accordance with a measured value of the master sphere at the predetermined measuring position.

BRIEF DESCRIPTION OF THE DRAWINGS

FIGS. 5A and 5B are detail drawings showing a master ball setting part of the ball diameter automatic measurement device according to the present invention;

FIG. 9A is a diagram showing a relationship between a reference value acquired by measuring the master ball previously, and measured values of the master ball, and FIG. 9B is a diagram showing an one example of methods in which measured values of five balls to be measured are corrected.

DESCRIPTION OF THE PREFERRED EMBODIMENTS

Figure 1:
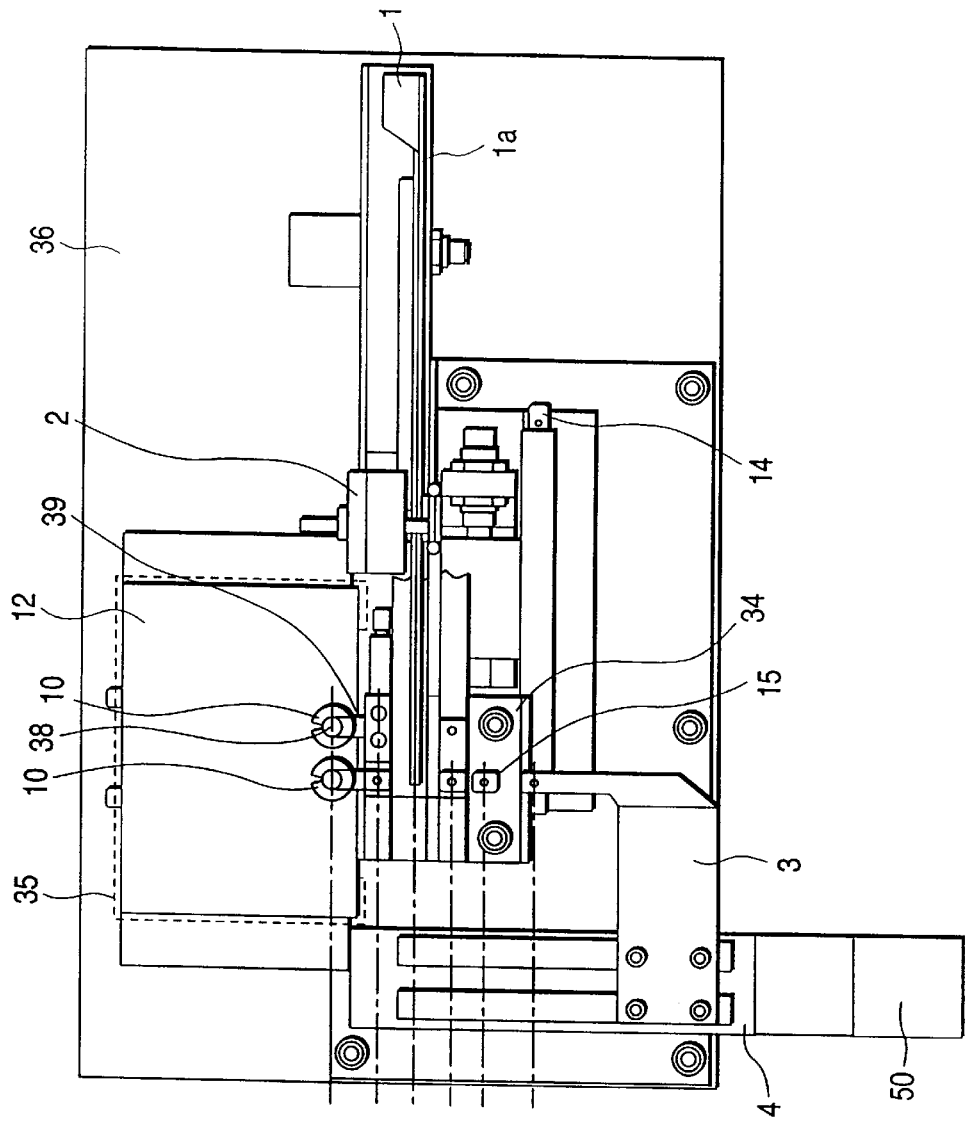
FIG. 1 is a plan showing a ball diameter automatic measurement device according to the present invention.
Figure 2B:
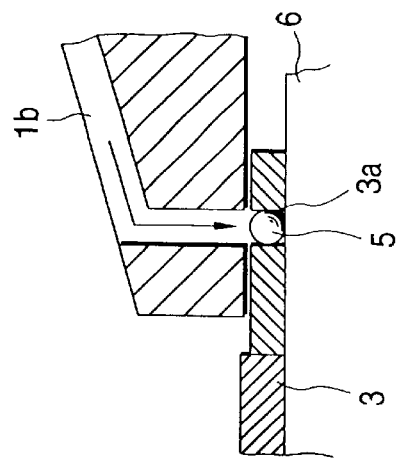
FIGS. 2A and 2B are side views showing the ball diameter automatic measurement device according to the present invention.
Figure 2A:
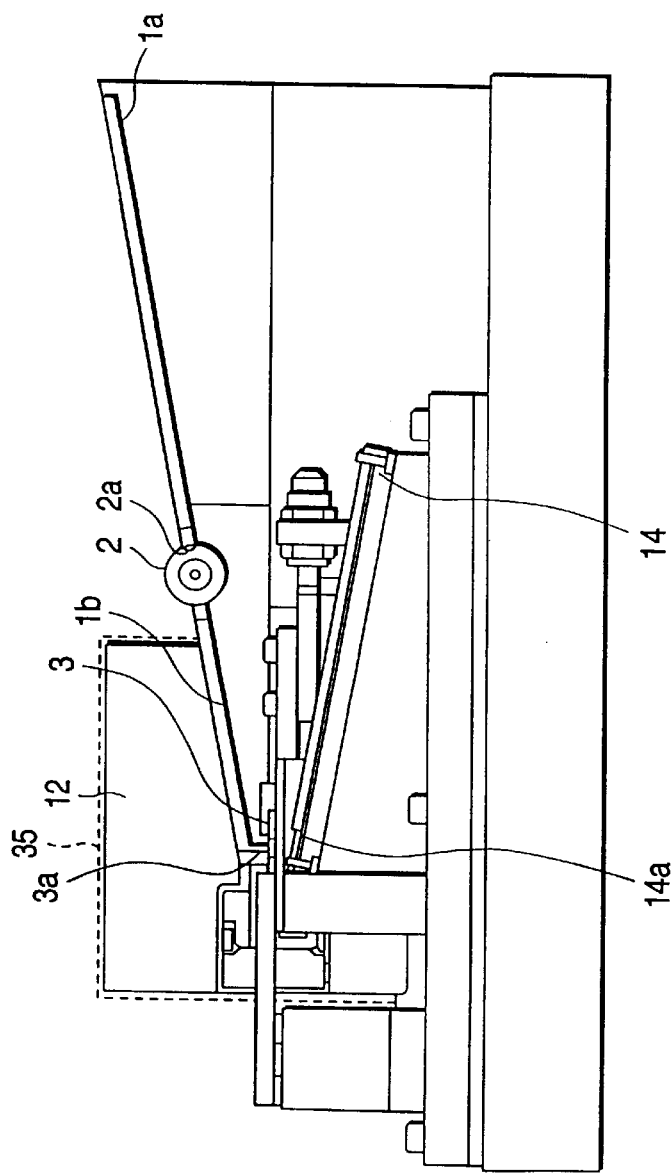
Figure 3:
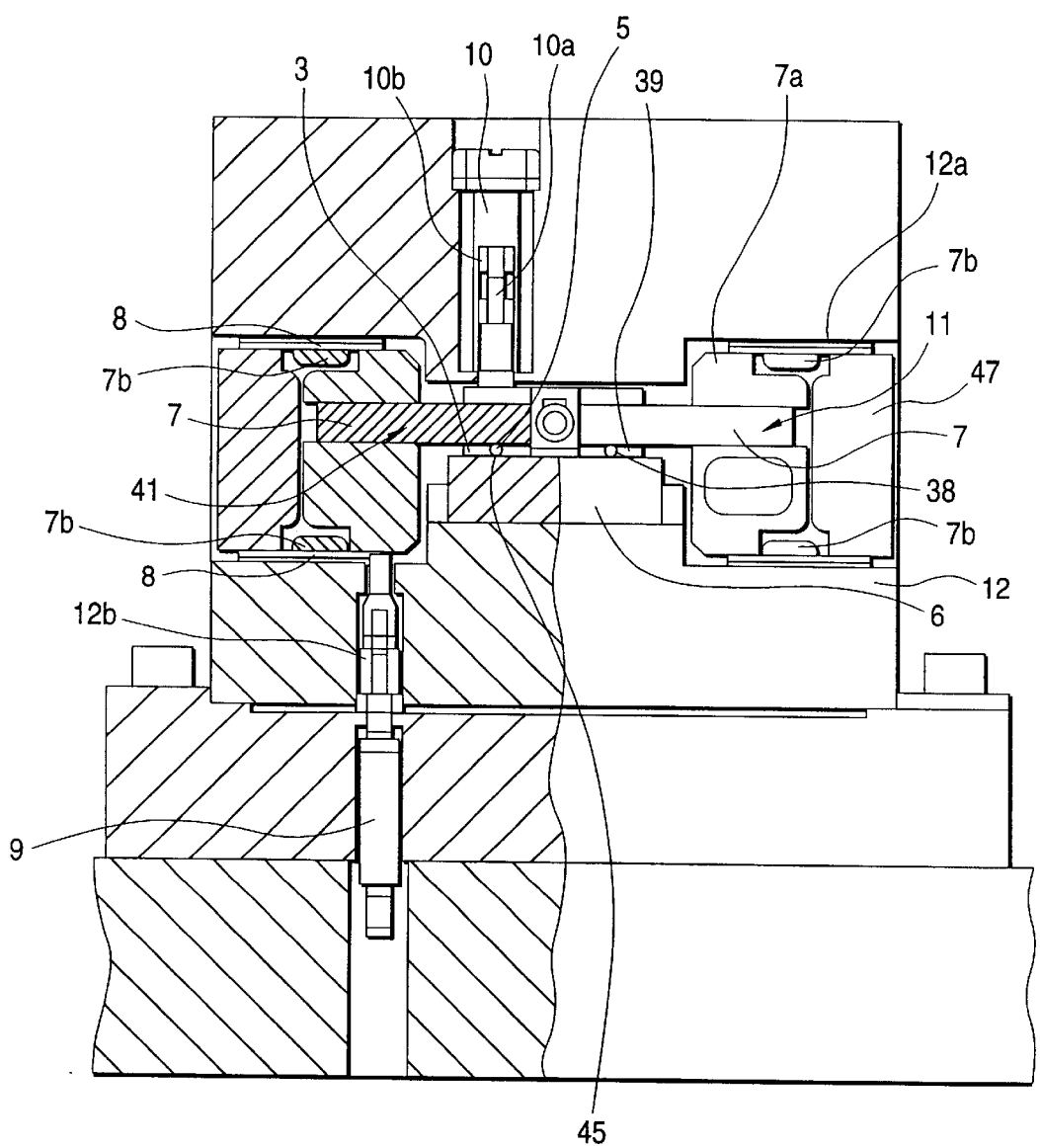
FIG. 3 is a detail drawing showing a measuring part of the ball diameter automatic measurement device according to the present invention.
Figure 4A:
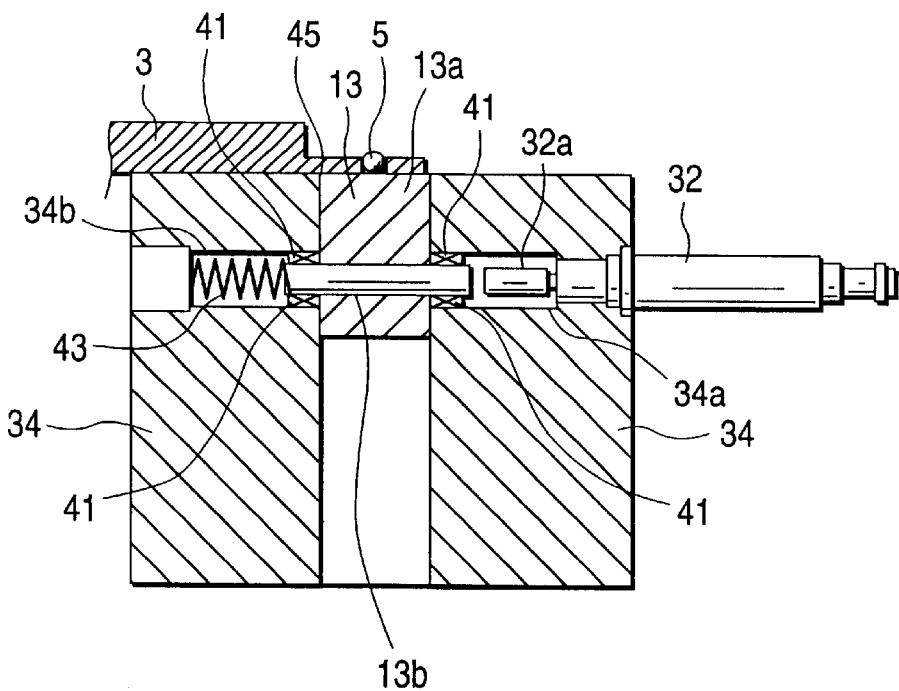
FIGS. 4A and 4B are detail drawings showing a phase changing part of the ball diameter automatic measurement device according to the present invention.
Figure 4B:
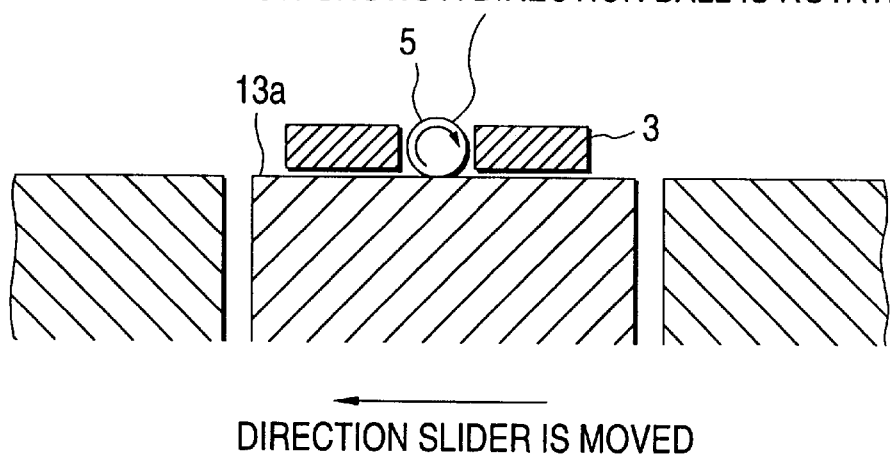
Figure 6:
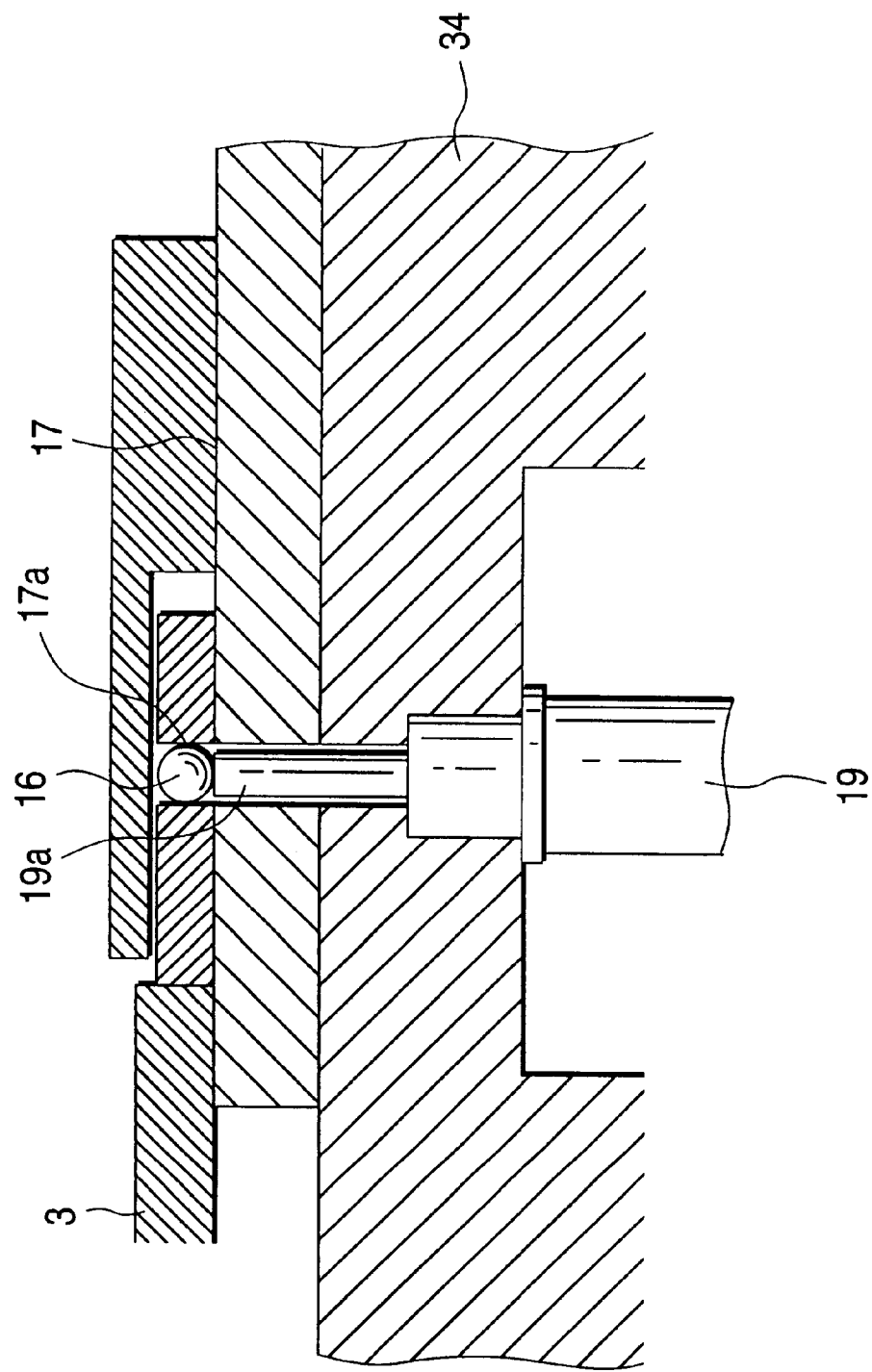
FIG. 6 is a detail drawing of the master ball setting part showing a situation in which a ball is shifted from a master storing plate to a dividing plate.
Figure 7A:
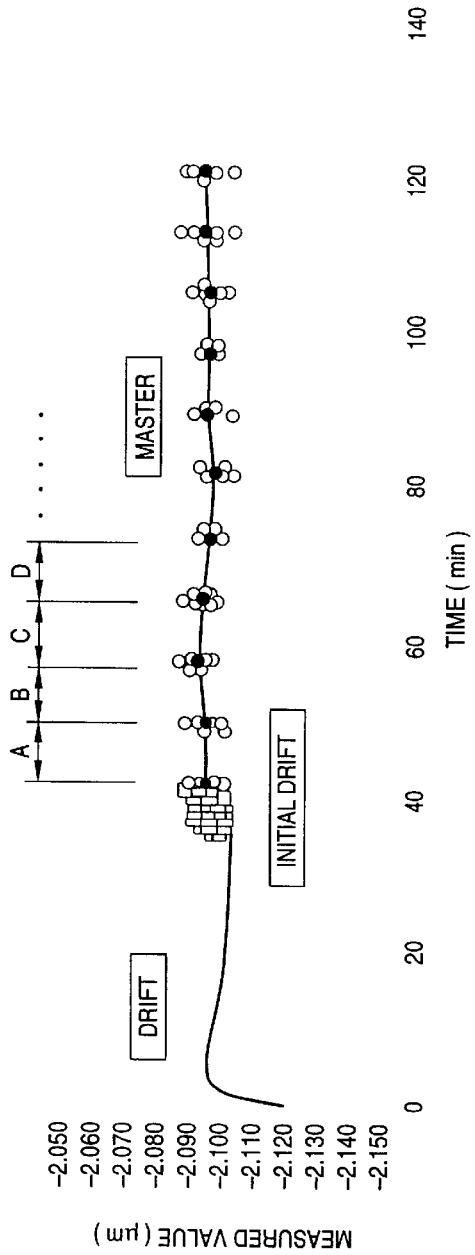
FIGS. 7A and 7B show examples of the result of measurement by the ball diameter automatic measurement device according to the present invention.

The embodiments of the present invention will be described based upon the drawings below. FIG. 1 is a plan showing a ball diameter automatic measurement device according to an embodiment of the present invention. FIG. 2A is a side view showing the ball diameter automatic measurement device. FIG. 2B is a partial enlarged view of the ball diameter automatic measurement device showing the movement of a ball to a dividing plate through a passage. FIG. 3 is a detail drawing showing a measuring part of the ball diameter automatic measurement device according to the present invention. FIG. 4A is a detail drawing showing a phase changing part of the ball diameter automatic measurement device according to the present invention. FIG. 4B is a partial enlarged view of the phase changing part showing a situation in which a ball is rolled (rotated) as a slider is moved. FIG. 5A is a detail drawing showing a master ball setting part of the ball diameter automatic measurement device according to the present invention. FIG. 5B is a sectional view viewed along a line VB—VB in FIG. 5A. FIG. 6 is a detail drawing of the master ball setting part showing a situation in which a ball is moved from a master storing plate to the dividing plate. FIG. 7 shows an example of the result of measurement by the ball diameter automatic measurement device. FIG. 8 is a block diagram showing the whole configuration of the ball diameter automatic measurement device.

Referring to FIG. 1, the configuration of the ball diameter automatic measurement device according to one embodiment of the present invention will be described below. A measuring column 12 is fixed to the body of the ball diameter measurement device 36 by a bolt not shown. A displacement sensor 10 is provided to two locations of the measuring column 12. A drift compensating ball 38 to be a reference ball is arranged under the displacement sensor 10 located on the right side of FIG. 1. The drift compensating ball 38 is provided to compensate drift and its position is fixed. To position the drift compensating ball 38 at a predetermined position, a hole for fixing the ball is provided at the end of a T-type member 39 which is a member for positioning the ball 38 as shown in FIG. 1 in such a manner that the drift compensating ball 38 is put in the hole. The other end of the T-type member 39 is fixed to a base 34 in two locations by bolts. In this embodiment, the T-type member is used, however, the shape is not limited to T type.

Multiple balls 5 to be measured are arranged and stored in a loading shoot 1 located on the right side of FIG. 1. The balls to be measured 5 are aligned in a line along a passage 1a which is defined by a groove provided on the bottom of the loading shoot 1 and sent to a divider 2. This is because the side of the loading shoot 1 is located in a higher position than the end of the passage 1b and then is slant as shown in FIG. 2A and 2B. Therefore, balls to be measured can be automatically rolled on the passage 1a. The divider 2 is constituted so that each ball to be measured 5 is put in a notch 2a provided to the round divider 2. In this embodiment, the notch in the shape of a circular arc in which only one ball is put is provided on the round periphery of the divider 2. The shape of the notch is not limited and may be also rectangular so that only one ball is put. For example, the shape of the notch may be also square. The divider 2 can be turned by driving means not shown and one ball put in the notch 2a can be moved to the passage 1b on the reverse side by turning the divider clockwise as shown in FIG. 2A. The divider is constituted so that after movement, the divider is turned again and the notch 2a can be returned to the side of the passage 1a.

A ball to be measured 5 or a master ball 16 is arranged under the displacement sensor 10 located on the left side in FIG. 1. As shown in FIG. 3, in a measurement position, a drift compensating measurement system 11 for compensating drift and a measurement system 41 are arranged. Basically both are the same and form symmetrical structure. Concretely, respective balls (the drift compensating ball 38 and a ball to be measured 5 or the master ball 16) are held between a gauge element 7 and a measuring table 6 under the displacement sensor 10. The measuring table 6 is fixed to the measuring column 12. In this embodiment, the measuring table 6 is pressed by a plate spring. Its fixing method, however, is not limited thereto. A concave portion 12a is provided to the side of the measuring column 12, a gauge element supporting part 7a holding the gauge element 7 to fix the position of the gauge element 7 is put in the concave portion and parallel plate springs 8 are provided to the upper surface and the lower surface of the gauge element supporting part 7a. A plate spring supporting part 47 is provided to the side of the gauge element supporting part 7a with the plate spring supporting part fixed to the measuring column 12 to fix the parallel plate springs 8 to the upper surface and the lower surface of the gauge element supporting part 7a. The parallel plate springs 8 are respectively reinforced by reinforcement 7b. Each of the measurement system 41 and the drift compensating measurement system 11 is provided with a sensor lifting cylinder 9 which is provided in a hole 12b of the measuring column 12 under the gauge element supporting part 7a so as to slightly move the gauge element 7 while a horizontal posture of the gauge element 7 is kept maintained. The measurement system 41 is different from the drift compensating measurement system 11 in that the drift compensating measurement system 11 is held by the T-type member 39 which is a member for positioning the drift compensating ball 38 at a predetermined position, but a ball to be measured put in a ball holding hole 3a of a dividing plate 3 in the measurement system 41 can be moved on the measuring table 6. Each surface of the measuring table 6 and the gauge element 7 is subject to a surface-finishing treatment so as to be a very precise plane, because very strict precision is required to measure the diameter of a ball. The measuring column 12 surrounding the measuring table 6, the gauge element 7, the parallel plate springs 8 and others is made of a material with a low thermal expansion so as to prevent the failure of measurement due to thermal expansion. The measuring column 12 is covered with an acrylic cover 35.

In a phase changing position, as shown in FIG. 4A, a phase changing cylinder 32 is built in a hole 34a provided to the side of the base 34, and a head rod 32a for pressing a slide shaft 13b is attached to the end of the phase changing cylinder 32. A slider 13 is arranged between the bases 34. The slider 13 is made of the body 13a of the slider and the slide shaft 13b and they are integrated. A spring 43 is attached into a hole 34b and one end of the spring 43 is bonded to the left end of the slide shaft 13b. A sliding bearing 41 is attached to a part in the entrance of the base 34 of the slide shaft 13b and surrounds the slide shaft 13b.

In a master storage position, as shown in FIG. 5A, an advance cylinder 18 is attached to a rail table 33. A master storing plate 17 is attached to the side of the upper surface of the advance cylinder 18 and a slide 20 is attached to the side of the lower surface. The slide 20 is put on a rail 33a and can be moved on it. A cylinder inserting hole 17a for receiving the master ball 16 or passing it to the dividing plate 3 is provided to the master storing plate 17 and the master ball 16 is stored in the hole except in measuring the master ball 16. A lifting cylinder 19 provided with a head rod 19a for inserting into the cylinder inserting hole 17a is arranged inside the base 34. Next to the lifting cylinder 19 as shown in FIG. 5B, a photoelectric sensor 15 for checking whether the master ball 16 or a ball to be measured 5 is put in the ball holding hole 3a of the dividing plate 3 or not is attached to the base 34.

In an unloading position, as shown in FIG. 2A, the end of the passage 14a is arranged immediately under the ball holding hole 3a provided to the dividing plate 3. The end of the passage 14a connects to an unloading shoot 14, the unloading shoot 14 is arranged in a lower position than the end of the passage 14a and the passage 14a is slant.

As shown in FIG. 1, the dividing plate 3 is fixed to a movable part of a slide 4 by a bolt and a ball holding hole 3a the diameter of which is slightly larger than the diameter of a ball is provided to the end of the dividing plate 3. A ball to be measured 5 or the master ball 16 is inserted into the ball holding hole 3a. The dividing plate 3 can be moved to each of the measurement position, the phase changing position, a loading position, the master storage position, a detection position and the unloading position respectively described on the left side of FIG. 1 while either balls is being held in the ball holding hole 3a. The movable part of the slide 4 is moved along a guide rail of the slide 4 by a moving member which comprises a motor 50 and a feed screw (not shown) respectively arranged behind the slide 4.

Next, referring to the drawings, the operation of measurement in this embodiment will be described. First, preparatory work before main measurement will be executed using the master ball 16. The master ball 16 means a satisfactory ball the dimension measured precisely beforehand of which is known and the deviation of the diameter of which is very small. FIG. 7A shows the change of the measured values of the master ball 16 in this embodiment. In FIG. 7A, the horizontal axis shows time since the start of measurement and the vertical axis shows measured values. Each measured value shown in FIG. 7A is obtained by subtracting the measured value (the diameter) of the drift compensating ball 38 of the drift compensating measurement system 11 from the measured value (the diameter) of the master ball 16.

First, the master ball 16 is positioned in the measurement position according to a procedure described later and measurements are continuously taken with the gauge element 7 in contact with the master ball 16 until it is judged that measured values are stable. In this embodiment, a program for sequence operation of a personal computer 22 described later is set so that it is judged that measured values are stable if temperature drift is 1 nm or less per 15 minutes. However, the above condition can be suitably varied according to a measurement condition and others. A part shown as drift in FIG. 7A corresponds to the above condition and in the example, it takes approximately 35 minutes. A program may be also set so that if time required till stability is approximately fixed, time required till stability is beforehand measured and after the time elapses, the next process is started. Next, false measurement in which measurement operation and phase changing operation respectively described later are repeated by predetermined times is executed. The reason why false measurement is further executed by predetermined times after measured values are stable is that initial measured values may be unstable due to the change of temperature and others because measurement is started and the movable part starts to be operated. In this embodiment, a program is set so that false measurement is repeated by fifty times, however, the present invention is not limited to these times. "□" in FIG. 7A denotes a false measured value. After the above preparation, main measurement is automatically started. In FIG. 7A, a main measured value is shown by ○. In this embodiment, in consideration of the further temperature drift of the device in addition to the above preparation before main measurement and the compensation of temperature change using the drift compensating measurement system, a process, in which five balls to be measured 5 are measured after the master ball 16 is measured and the master ball 16 is again measured, is repeated. In other words, the master ball 16 is repeatedly measured every five-ball-measurements. A black circle in FIG. 7A denotes the average value of the result measured ten times of such repeated process while a phase described later is changed, and then adjacent black circles are connected by a straight line.

Next, the measurement of the master ball 16 will be described in detail. As shown in FIG. 5A, the master ball 16 is stored on the master storing plate 17 and when the advance cylinder 18 advances, the slide 20 to which the master storing plate 17 is attached is moved on the rail 33 and the cylinder inserting hole 17a of the master storing plate 17 is positioned over the lifting cylinder 17. Next, as shown in FIG. 6, the lifting cylinder 19 is lifted, the rod of the lifting cylinder 17 is inserted into the cylinder inserting hole 17a of the master storing plate 17 and the master ball 16 put in the cylinder inserting hole 17a of the master storing plate 17 is received or passed to the ball holding hole 3a of the dividing plate 3.

As shown in FIG. 3, the dividing plate 3 is moved toward the measurement position of the master ball 16. The dividing plate 3 is once positioned approximately 0.5 mm before the master ball 16 is positioned in a ball measurement position 45 by the dividing plate 3. The master ball 16 is positioned by lifting the sensor lifting cylinder 9, lifting the gauge element 7, providing clearance enough for a ball to pass between the gauge element 7 and the measuring table 6 without touching to the gauge element 7 and inserting the ball holding hole 3a into the clearance, and the sensor lifting cylinder 9 is lowered. The master ball 16 is held between the measuring table 6 and the gauge element 7 by this lowering. However, as this position is different from the original ball measurement position 45, the dividing plate 3 is moved and the master ball is moved to the original ball measurement position 45. At that time, the master ball 16 is slid without rotating it. The master ball 16 is rubbed by the measuring table 6 and the gauge element 7 because of this movement and minute dust which adheres to the measured points of the master ball 16 is removed. As described above, foreign matters such as dust which adhere to the ball can be removed by using a process in which the ball is positioned before the ball measurement position 45, afterward the ball is held between the measuring table 6 and the gauge element 7 and moved to the ball measurement position 45 without rotating the ball. Further, the above process can be also utilized for changing a phase in a direction in which the ball is rolled by the dividing plate 3 as described above.

The diameter of the master ball 16 put in the ball holding hole 3a of the dividing plate 3 is measured by the very precise displacement sensor 10 attached to the gauge element 7. The displacement sensor is an electronic indicator, a coil 10b is arranged around a core 10a fixed to the gauge element 7 and the change of voltage due to the vertical displacement of the core 10a is converted to measured values. Simultaneously when the master ball 16 is measured, the diameter of the drift compensating ball 38 the nominal distance of which has the same diameter as the master ball 16 is also measured. The measured value of the drift compensating ball 38 is subtracted from the measured value of a ball to be measured (the master ball 16 in this case). As described above, the effect of temperature drift can be reduced by compensating such as subtracting the measured value of the drift compensating ball 38 from the measured value of a ball to be measured 5 and the master ball 16 with the drift compensating ball 38 as a reference ball.

Referring to FIG. 4A, the operation of a phase changing part which is next operation will be described in detail. Changing a phase means changing the measured point of a ball. When measurement is finished, the sensor lifting cylinder 9 is lifted and the gauge element 7 is lifted. The master ball 16 in the ball holding hole 3a is moved and rotated on the measuring table 6, when the dividing plate 3 is moved from the measurement position to the phase changing position. The slider 13 is touched to the wall on the right side of the base 34 with the phase changing cylinder 32 unpressed and the clearance 45 exists between the wall on the left side of the base 34 and the body of the slider with the phase changing cylinder 32 unpressed. The ball holding hole 3a holding the master ball 16 is positioned on the slider 13. When the master ball 16 is touched to the slider 13 and positioned on the slide 13, the slide shaft 13b is pressed by the head rod 32a of the phase changing cylinder 32 and moved left, the slider 13 is moved left and the ball 5 is rotated (rolled) by slight quantity.

When the head rod 32a of the phase changing cylinder 32 is extended and presses the slide shaft 13b, the slider 13 starts to be moved, the clearance 45 on the left side is gradually moved to the right side and is all moved to the right side. At that time, the slide shaft 13b can be smoothly moved by the sliding bearing 41 in the base 34. As a result, the slider 13 is moved by the quantity of the clearance. As described above, the master ball 16 positioned by the body 13a of the slider is rotated by the quantity of movement by the movement of the body 13a of the slider 13. FIG. 4B shows the details of the above movement of the slider 13 and the rotation (rolling) of a ball to be measured (the master ball 16 in this case).

Next, the dividing plate 3 holding the master ball 16 rotated by the quantity of movement in the ball holding hole 3a is moved and the diameter of the ball is measured according to the same procedure as the above one. At that time, when the master ball 16 is not located on the slider 13 because of the movement of the dividing plate 3 in the phase changing position, the phase changing cylinder 32 is operated and the head rod 32a is made to regress. Simultaneously at this time, pressure is applied to the slide shaft 13b by the repulsion of a spring 43 provided to the hole 34b, the slider 13 is moved to right side, finally the slider 13 is touched to the wall on the right side of the base 34 and returned to an original position.

In changing a phase, it should be noted that the master ball 16 is rotated in a direction different from a direction in which the dividing plate 3 is moved. In this embodiment, a phase is changed in a direction perpendicular to a direction in which the dividing plate 3 is moved. As described above, the same location is prevented from being measured even if a phase is changed and the master ball can be precisely rotated by desired quantity by differentiating a direction in which the master ball is rotated to change a phase from a direction in which the dividing plate 3 is moved. That is, if a phase is changed in the same direction as a direction in which the dividing plate 3 is moved, accidental sliding and others may occur during movement between the measurement position of the dividing plate 3 and the phase changing position and it is difficult to control quantity in which the master ball 16 is rotated so that the quantity is precisely desired quantity. In this embodiment, as the measurement of ten times is executed per one ball, desired quantity is 1/20 rotation, however, the present invention is not limited to this and suitable rotation may be selected.

As described above, a process in which the ball is once positioned before the ball measurement position 45 so that a foreign matter such as dust can be removed in measurement even if the foreign matter adheres, afterward the ball is slid by moving the dividing plate 3 and positioned in the ball measurement position 45 is executed. Therefore, distance (the number of revolution) in which a ball goes from the phase changing position to the measurement position and distance (the number of revolution) in which the ball returns from the measurement position to the phase changing position are different. That is, it is a reason why the distances are different from each other that when the ball returns from the ball measurement position the ball is usually rotated (rolled), whereas when the ball goes towards the ball measurement position the ball is slid without being rotated (rolled) by predetermined distance. Although it is difficult to acquire the precise quantity of rotation, compared with that in changing a phase in perpendicular directions as described above, a phase is also changed in movement between the phase changing position and the measurement position.

The master ball 16 put in the ball holding hole 3a is positioned in the ball measurement position 45, after the diameter is measured, the master ball is moved to the phase changing position, the phase which is a position for measuring the diameter of the master ball 16 is changed, the master ball is again returned to the measurement position and the diameter of the ball is measured. Such operation is executed between false measurement and main measurement. In false measurement, in this embodiment, the diameter is measured fifty times and in main measurement, the diameter is measured ten times (reciprocation between the measurement position and the phase changing position is executed ten times).

When the measurement is finished, the dividing plate 3 is moved and the ball holding hole 3a is positioned in the master storage position. The advance cylinder 18 is made to advance and the master ball 16 put in the ball holding hole 3a can be stored in the cylinder inserting hole 17a of the master storing plate 17 by locating the cylinder inserting hole 17a which is the master ball storage position immediately under the ball holding hole 3a and lowering the rod 19a of the lifting cylinder 19. Afterward, the advance cylinder 18 makes the master storing plate 17 regress. Next, the dividing plate 3 is moved to the detection position, the ball holding hole 3a is positioned so that it is immediately under the photoelectric sensor 15 and it is verified that there is no ball. When it cannot be verified that there is no master ball 16, the ball holding hole 3a is again positioned in the cylinder inserting hole 17a. Afterward, the ball holding hole 3a is positioned so that it is immediately under the photoelectric sensor 15 and the similar operation is repeated.

Next, a ball to be measured 5 is measured. The ball to be measured 5 from the loading shoot 1 passes the passage 1a, reaches the divider 2, is put in the notch 2a of the divider 2, the divider 2 is rotated and the ball to be measured 5 put in the notch 2a is shifted to the passage 1b. The ball to be measured 5 is rolled to the end of the passage 1b because of the slope of the passage 1b. Prior to it, the motor 50 is driven, the dividing plate 3 is moved to the loading position 1, the ball holding hole 3a is positioned so that it is immediately under the end of the passage 1b and when the ball to be measured 5 is dropped from the end of the passage 1b into the ball holding hole 3a, it is held in the ball holding hole 3a. FIG. 2B shows the detailed situation. Afterward, the similar procedure to that in the case of the master ball 16 is taken, the ball is positioned in the measurement position, after the diameter is measured, is moved to the phase changing position, the phase which is a position for measuring the diameter of the ball to be measured 5 is changed, the ball is again returned to the measurement position and the diameter of the ball the phase of which is changed is measured.

The ball to be measured 5 the measurement of which is finished as described above is dropped to the passage 14a through the ball holding hole 3a of the dividing plate 3 in the unloading position shown in FIG. 2. The ball to be measured 5 is ejected to the unloading shoot 14 through the passage 14a. Next, the ball holding hole 3a of the dividing plate 3 is positioned so that it is immediately under the photoelectric sensor 15 located in the detection position and the photoelectric sensor 15 verifies that there is no ball to be measured 5 in the ball holding hole 3a. Hereby, it can be verified that the ball to be measured 5 is ejected from the ball holding hole 3a. If it cannot be verified by the photoelectric sensor 15 that there is no ball to be measured 5 in the ball holding hole 3a, the ball holding hole 3a is reciprocated between the unloading position and the detection position as the master ball 16.

Figure 7B:
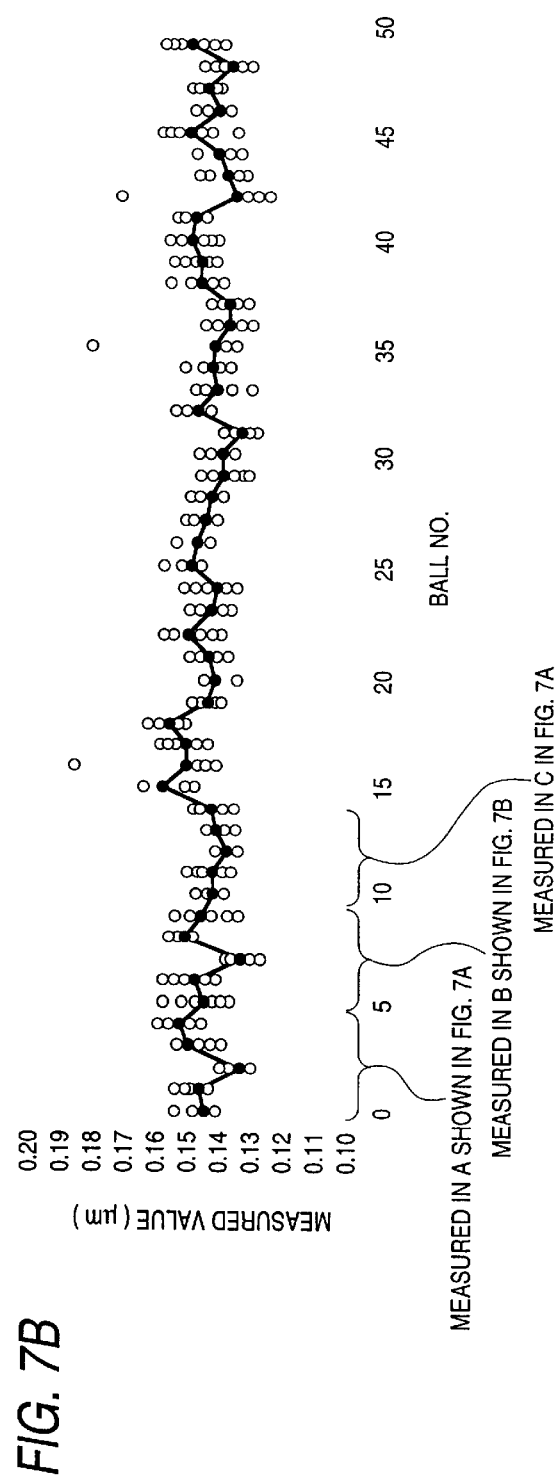
Figure 8:
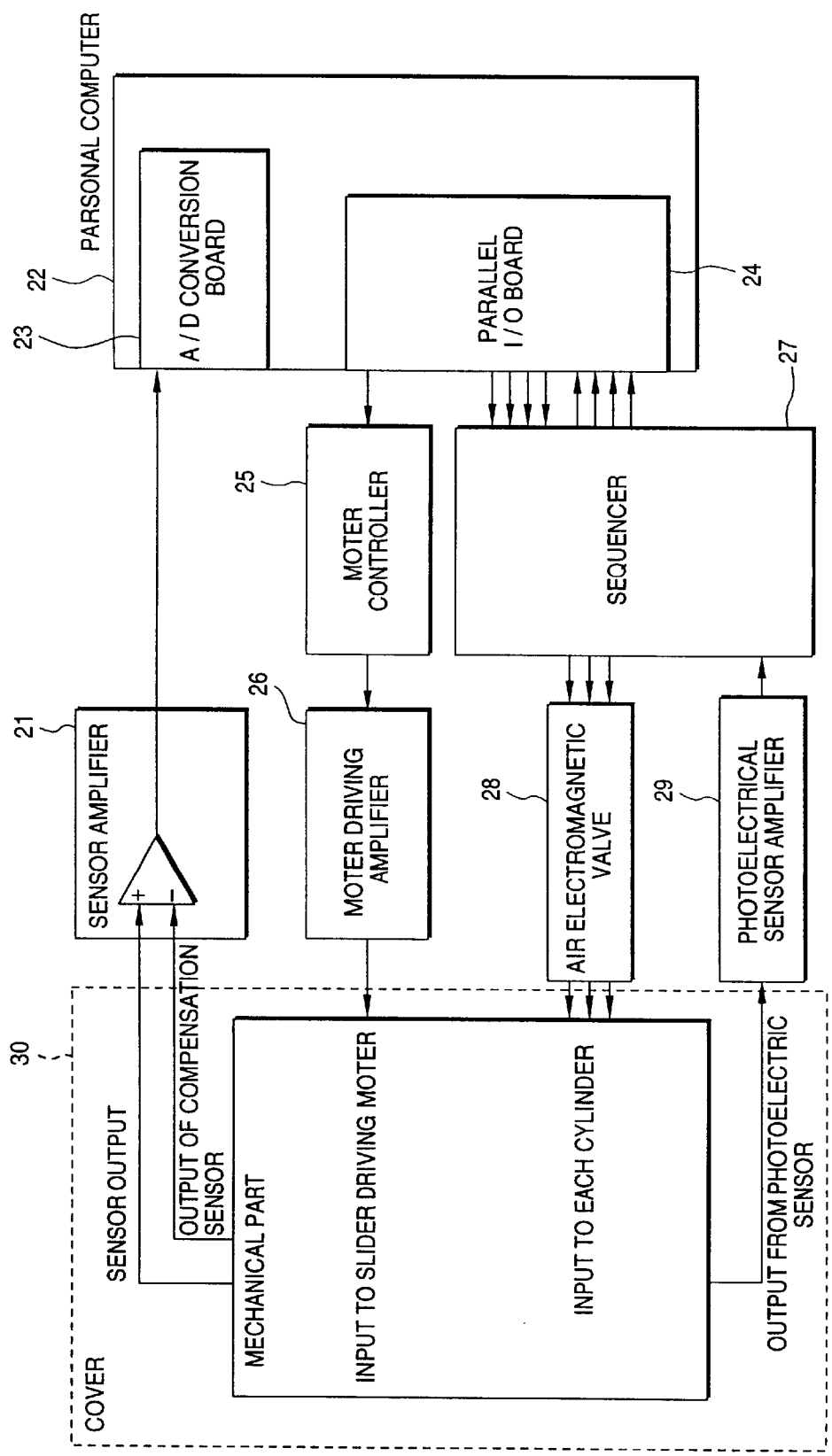
FIG. 8 is a block diagram showing the whole configuration of the ball diameter automatic measurement device according to the present invention.

The horizontal axis in FIG. 7B denotes the number of balls to be measured 5 and a vertical axis denotes values of raw data. FIG. 7B shows fifty balls to be measured 5, similarly in the case of the master ball 16, a white circle shows the individual result of measuring ten phases per one ball and a black circle shows the average value. In data shown in FIG. 7B, first fives correspond to a part A shown in FIG. 7A, the next fives correspond to a part B shown in FIG. 7A, - - - , and the data of the master ball 16 corresponds to the data of a ball to be measured 5. That is, after main measurement shown by a circle at the end of "initial drift" shown in FIG. 7A (obtained by subtracting the measured values of the drift compensating ball from the measured values of the master ball) is finished, a ball to be measured is measured (obtained by subtracting the measured values of the drift compensating ball from the measured values of balls to be measured). In this case, five balls to be measured are measured ten times. Measurement is executed in the order of one master ball, balls to be measured and one master ball. Five balls to be measured are measured 5 after sufficient cleaning, however, it may be rarely considered that dust adheres to any of them and in that case, the measured value is extraordinarily large, compared with other measured values. FIG. 7B shows such three parts.

After the measurement of ten points of a ball is finished to remove such an extraordinarily measured value from data, ten data are statistically processed and the product of skewness (the right and left symmetry of distribution) and the degree of a gradient (the degree of an acute angle or flatness of distribution) is calculated. These skewness and degree of a gradient are acquired by a well-known expression showing drift from normal distribution. If the value of the product of these skewness and degree of a gradient normally exceeds 2, it is judged that an extraordinary measured value is included in data and the largest one of ten data is removed. Next, the same is also executed for nine data, until the product of skewness and the degree of a gradient normally reaches 2 or less, the largest data is removed and the similar calculation is repeated. The number of data may be smaller than 10 by the above processing, however, measurement may be also increased by an insufficient number.

In this embodiment, correction in which the variation (difference from a measured value measured beforehand which may be regarded as true) of the average value of the measured values (10 values in this embodiment) of one of the nearest master balls before and after is subtracted is executed. However, for a method of correction, as there are three typical methods described below, any may be also used. Next, the average value and the deviation of the diameter are calculated based upon acquired effective data. The deviation of the diameter is calculated using 6σ for example. "σ" denotes standard deviation. In this embodiment, the deviation of the diameter is also acquired using 6σ.

In this embodiment, after the measurement of the master ball 16 is finished, five balls to be measured 5 are measured. In the measurement of the balls to be measured 5, as the measurement of the master ball, a process in which a phase is changed after measurement and measurement is executed is also repeated. After the measurement of balls to be measured 5 is finished, the master ball 16 is again measured. At that time, data may be also corrected. However, data may be also corrected after the collection of the whole data. In this embodiment, while the master ball is measured, five balls to be measured are measured, however, the present invention is not limited to this. For example, ten or twenty balls to be measured may be also measured.

Figure 9A:
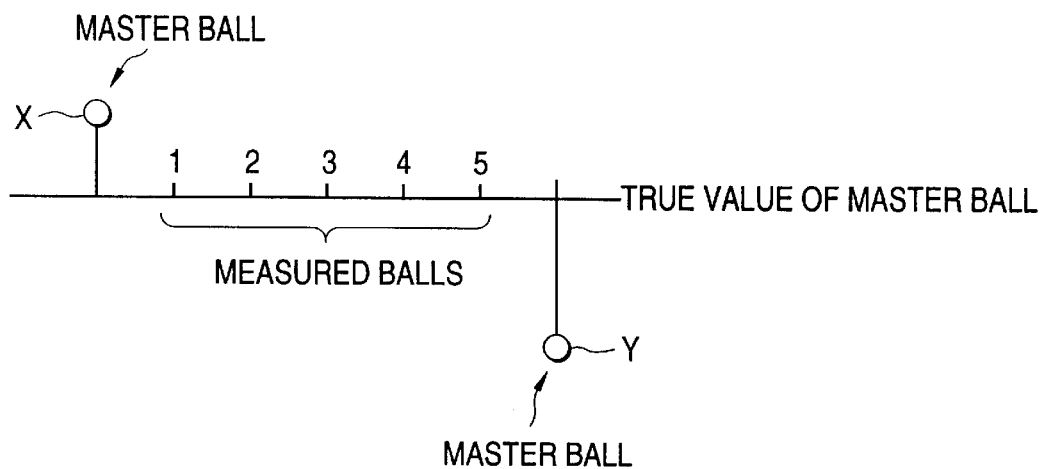
FIGS. 9A and 9B are diagrams for explaining a correction of the measured values which utilizes a master ball.

For a method of correcting a measured value, three typical methods described below can be given. A case that the measured values X and Y of the master balls 16 before and after have relationship shown in FIG. 9A with a reference value (hereinafter, called a true value) acquired by measuring the master balls 16 precisely beforehand will be described as an example.

Figure 9B:
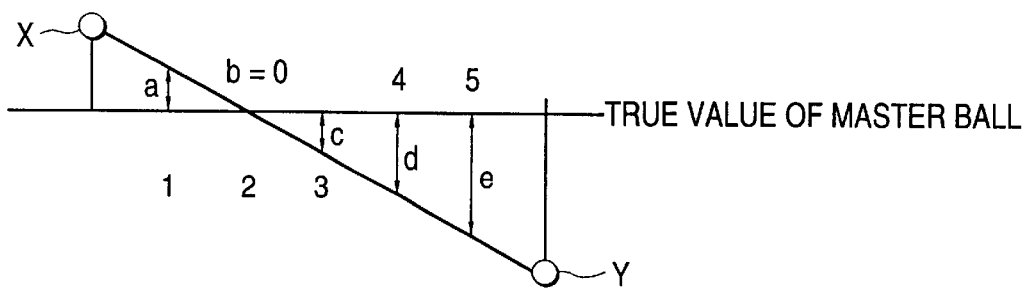

According to a first method, the result of two master balls 16 is interpolated as shown in FIG. 9B and a to e (c to e are negative values in this example) are subtracted from the result of balls to be measured 5 for correction.

According to a second method, the average value which is equivalent to difference from a true value of the result of two master balls 16 is subtracted from individual data of balls to be measured 5. In this case, concretely, (X+Y)/2 is subtracted from individual data.

According to a third method, a value to be corrected is determined based upon the result of the measurement of the nearest master ball 16. In this case, either of X or Y is to be selected. The typical methods of correcting data are described above, however, the present invention is not limited to these.

Next, referring to a block diagram shown in FIG. 8, the whole configuration of the ball diameter automatic measurement device will be described. The output of a sensor and a sensor for compensation is input to a sensor amplifier 21. The output of the sensor includes the measured values of the master ball 16 or balls to be measured 5 and the output of the sensor for compensation includes the measured values of the drift compensating ball 38. Difference between the output of the sensor and the output of the sensor for compensation is output from the sensor amplifier 21, is input to an analog-to-digital conversion board installed in a personal computer 22 and the measured values are stored in the personal computer 22.

An instruction for sliding a mechanical part including the dividing plate 3 and an instruction for operating each cylinder are respectively sent from a parallel I/O board 24 in the personal computer 22 to a motor driving amplifier 26 via a motor controller 25 and sent from the parallel I/O board in the personal computer to an air electromagnetic valve 28 via a sequencer 27. A signal from the photoelectric sensor 15 for detecting a ball is input from a photoelectric sensor amplifier 29 to the personal computer via the sequencer 27 and the parallel I/O board 24. A program for storing the result of measurement and processing data and a program for enabling the above sequence operation are installed in the personal computer.

The whole mechanical part may be also covered with a cover 30 as schematically shown in FIG. 8. (The cover is not shown in FIG. 1.) If the ball diameter automatic measurement device is installed in a thermostatic chamber. the mechanical part is covered with an acrylic simple cover 30, however, if the above measurement device is installed in a normal work room, stable measured values can be acquired by attaching device for keeping the inside of the cover 30 fixed temperature.

As described above, as the automatic ball diameter measurement device according to the present invention is provided with mechanisms for loading and unloading plural balls, a mechanism providing a master ball so that it can be measured any time and a mechanism for arbitrarily changing a phase to be measured of a ball, measurement can be executed without depending upon labor, body temperature hardly influences and no difference is made in measurement. As the measurement device can be covered with the cover, the effect of the variation of air temperature is almost avoided and the diameter of a ball can be measured with the precision of ±0.01 μm or less.

According to the present invention disclosed in Claim 1, a ball can be moved to a measurement position without depending upon labor, the effect of the change of temperature upon the device including a ball by body temperature can be inhibited and the precision of measurement can be enhanced. When a position in which the diameter of a ball is measured is changed, a measuring condition every ball can be equalized, individual difference in workmanship is dissolved and the reliability of measured data can be enhanced.

The present invention is based on Japanese Patent Application No. Hei. 10-23172, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. Ball diameter automatic measurement device comprising:
   a ball carrying means for carrying a ball to be measured to a predetermined measuring position in a ball carrying direction;
   a ball diameter measuring means for measuring a diameter of said ball at said predetermined measuring position;
   a phase shifting means for shifting a phase of said ball so as to have a changeable measured portion of said ball every measurement; and
   a controller for controlling said ball carrying means and said phase shifting means.

2. Ball diameter automatic measurement device according to claim 1, in which a rotating direction of the ball when the ball is subjected to the movement by the ball carrying means is different from a rotating direction of the ball when the ball is subjected to a phase shifting by the phase shifting means.

3. Ball diameter automatic measurement device according to claim 1, further comprising a drift compensating ball, in which said ball diameter measuring means comprises:
   a main measurement system measuring a diameter of said ball to be measured;
   a drift compensating measurement system which is arranged adjacent to said main measurement system and measures a diameter of said drift compensating ball while said ball to be measured is being measured by said main measurement system simultaneously; and
   a comparing member for comparing the diameter of said ball to be measured which was measured by said main measurement system and the diameter of said drift compensating ball which was measured by said drift compensating measurement system, and
   in which each of said main measurement system and said drift compensating measuring system comprises a displacement sensor.

4. Ball diameter automatic measurement device according to claim 1, in which said ball includes a ball to be measured and a master ball having a reference size, said automatic measurement device further comprises:
   a master ball loading means for accommodating said master ball at an accommodating position and loading said master ball from said accommodating position to a position where said master ball is carriable by said ball carrying means.

5. Ball diameter automatic measurement device according to claim 1, in which said ball carrying means comprises:
   a loading shoot having one end capable of storing a plurality of balls including said ball to be measured and other end located at a position which is accessable by said ball carrying means; and
   a dividing member interposed between said one end and said other end for transporting only one of said plurality of said balls from said one end to said other end.

6. Ball diameter automatic measurement method comprising the steps of:
   carrying a ball to be measured to a predetermined measuring position in a ball carrying direction;
   measuring a diameter of said ball at said predetermined measuring position;
   shifting a phase of said ball by a predetermined angle so as to change a measured portion of said ball every measurement;
   repeating said measuring step and said shifting step by predetermined times; and
   calculating an average value of the diameters measured in said diameter measuring step and a diameter deviation of the diameters measured in said diameter measuring step.

7. Ball diameter automatic measurement method according to claim 6, in which a rotating direction of the ball when the ball is subjected to the movement during the ball carrying step is different from a rotating direction of the ball when the ball is subjected to a phase shifting by the phase shifting step.

8. Ball diameter automatic measurement method according to claim 6, in which said diameter measuring step comprises the steps of:
   measuring a diameter of said ball to be measured with a first displacement sensor;
   measuring a diameter of a reference ball with a second displacement sensor while the diameter of said ball to be measured is being measured by said first displacement sensor; and
   evaluating the diameter of said ball to be measured in accordance with a difference between an output of said first displacement sensor and an output of said second displacement sensor.

9. Ball diameter automatic measurement method according to claim 6, in which said ball includes a ball to be measured and a master ball having a reference size, said method further comprising the steps of:
   compensating a measured diameter of said ball to be measured in accordance with a measured value of said master ball at said predetermined measuring position.

* * * * *